United States Patent

Uusitalo et al.

(10) Patent No.: US 9,491,631 B2
(45) Date of Patent: Nov. 8, 2016

(54) METHOD AND APPARATUS FOR MANAGING A WIRELESS TRANSMITTER

(75) Inventors: Mikko Uusitalo, Helsinki (FI); Rapeepat Ratasuk, Hoffman Estates, IL (US); Nitin Mangalvedhe, Hoffman Estates, IL (US); Antti Sorri, Helsinki (FI); Iraji Sassan, Espoo (FI)

(73) Assignee: Nokia Technologies Oy, Espoo (FI)

( * ) Notice: Subject to any disclaimer, the term of this patent is extended or adjusted under 35 U.S.C. 154(b) by 92 days.

(21) Appl. No.: 14/388,250

(22) PCT Filed: Mar. 29, 2012

(86) PCT No.: PCT/IB2012/051530
§ 371 (c)(1),
(2), (4) Date: Sep. 26, 2014

(87) PCT Pub. No.: WO2013/144682
PCT Pub. Date: Oct. 3, 2013

(65) Prior Publication Data
US 2015/0050943 A1    Feb. 19, 2015

(51) Int. Cl.
*H04W 16/14* (2009.01)
*H04W 72/04* (2009.01)
*H04W 72/12* (2009.01)

(52) U.S. Cl.
CPC ......... *H04W 16/14* (2013.01); *H04W 72/0453* (2013.01); *H04W 72/1215* (2013.01)

(58) Field of Classification Search
CPC ........... H04W 16/14; H04W 72/0453; H04W 72/1215
See application file for complete search history.

(56) References Cited

U.S. PATENT DOCUMENTS

| 2008/0089280 | A1  | 4/2008  | Hu |
| 2009/0180492 | A1* | 7/2009  | Hu ........................ H04W 16/14 370/462 |
| 2011/0128895 | A1* | 6/2011  | Sadek .................. H04W 16/14 370/280 |
| 2011/0286401 | A1  | 11/2011 | Wijting et al. |
| 2013/0225159 | A1* | 8/2013  | Hulkkonen ........... H04W 16/14 455/423 |

FOREIGN PATENT DOCUMENTS

EP    2369755 A1    9/2011
WO  WO 2010073168 A2    7/2010

* cited by examiner

*Primary Examiner* — Kashif Siddiqui
(74) *Attorney, Agent, or Firm* — Seppo Laine Oy (57) ABSTRACT

In accordance with an example embodiment of the present invention, there is provided an apparatus, comprising a memory configured to store at least one first parameter, at least one processing core configured to control, using a cognitive radio principle, radio transmission using a first radio access technology, wherein the at least one first parameter is used in the cognitive radio principle, wherein the at least one processing core is configured to select the at least one first parameter in dependence of at least one second parameter, wherein the at least one second parameter at least one of relates to a second radio access technology and comprises a length of a last burst or silent period of the first radio access technology.

22 Claims, 5 Drawing Sheets

METHOD AND APPARATUS FOR MANAGING A WIRELESS TRANSMITTER

TECHNICAL FIELD

The present application relates generally to coexistence of more than one kind of radio communication in a frequency band.

BACKGROUND

Wireless communication between electronic devices requires that devices participating in the communication, for example a base station and a mobile station, are configured to conform to an agreed framework for communication. The agreed framework comprises defined procedures that are used to effect the communication in the framework context, wherein the context may comprise for example air interface resources, or radio resources, such as at least one frequency band. Such frameworks may be known as radio access technologies, or RATs. A RAT may be defined in industry standards that device manufacturers can refer to when designing products such that they are capable of communicating according to the RAT.

When standards are used correctly, interoperability between devices from a plurality of suppliers may be achieved. For example, a cellular telephone produced by a first manufacturer may be capable of communicating with a cellular telephone produced by a second manufacturer, using a base station produced by a third manufacturer and a core network produced by a fourth manufacturer.

Radio access technologies may be designed for specific use cases in mind. For example, cellular telephony RATs may be optimized for ease of roaming, wide-area coverage and battery power efficiency. On the other hand, other RATs such as those designed for wireless hotspots for stationary users may be optimized to produce high peak datarates in the network to mobile direction.

Methods to improve interoperation between RATs may include, for example, selecting non-overlapping frequency ranges for the respective RATs to avoid interference. Alternatively or in addition communications pertaining to each RAT may be sequenced so that only one RAT is active at any given time. For example, a communication device may partition time into consecutive non-overlapping timeslots, and assign the timeslots to different RATs the communication device is configured to communicate in accordance with.

Cognitive radios operate by sharing a spectrum band dynamically. A cognitive radio may be configured to use a defined spectrum resource in a subordinate manner, wherein the cognitive radio will determine whether the spectrum resource is unused before using it to convey information. A cognitive radio may be configured to detect if a privileged node is accessing the same spectrum resource, responsive to which the cognitive radio may be configured to vacate the spectrum resource to avoid collision with the privileged node.

SUMMARY

Various aspects of examples of the invention are set out in the claims.

According to a first aspect of the present invention, there is provided an apparatus, comprising a memory configured to store at least one first parameter, at least one processing core configured to control, using a cognitive radio principle, radio transmission using a first radio access technology, wherein the at least one first parameter is used in the cognitive radio principle, wherein the at least one processing core is configured to select the at least one first parameter in dependence of at least one second parameter, wherein the at least one second parameter at least one of relates to a second radio access technology and comprises a length of a last burst or silent period of the first radio access technology.

According to a second aspect of the present invention, there is provided a method, comprising storing at least one first parameter, controlling, using a cognitive radio principle, radio transmission using a first radio access technology, wherein the at least one first parameter is used in the cognitive radio principle, and selecting the at least one first parameter in dependence of at least one second parameter, wherein the at least one second parameter at least one of relates to a second radio access technology and comprises a length of a last burst or silent period of the first radio access technology.

According to a third aspect of the present invention, there is provided a computer program product comprising a computer-readable medium bearing computer program code embodied therein for use with a computer, the computer program code comprising code for storing at least one first parameter, code for controlling, using a cognitive radio principle, radio transmission using a first radio access technology, wherein the at least one first parameter is used in the cognitive radio principle, and code for selecting the at least one first parameter in dependence of at least one second parameter, wherein the at least one second parameter at least one of relates to a second radio access technology and comprises a length of a last burst or silent period of the first radio access technology.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

An example embodiment of the present invention and its potential advantages are understood by referring to FIGS. 1 through 5 of the drawings.

Figure 1:
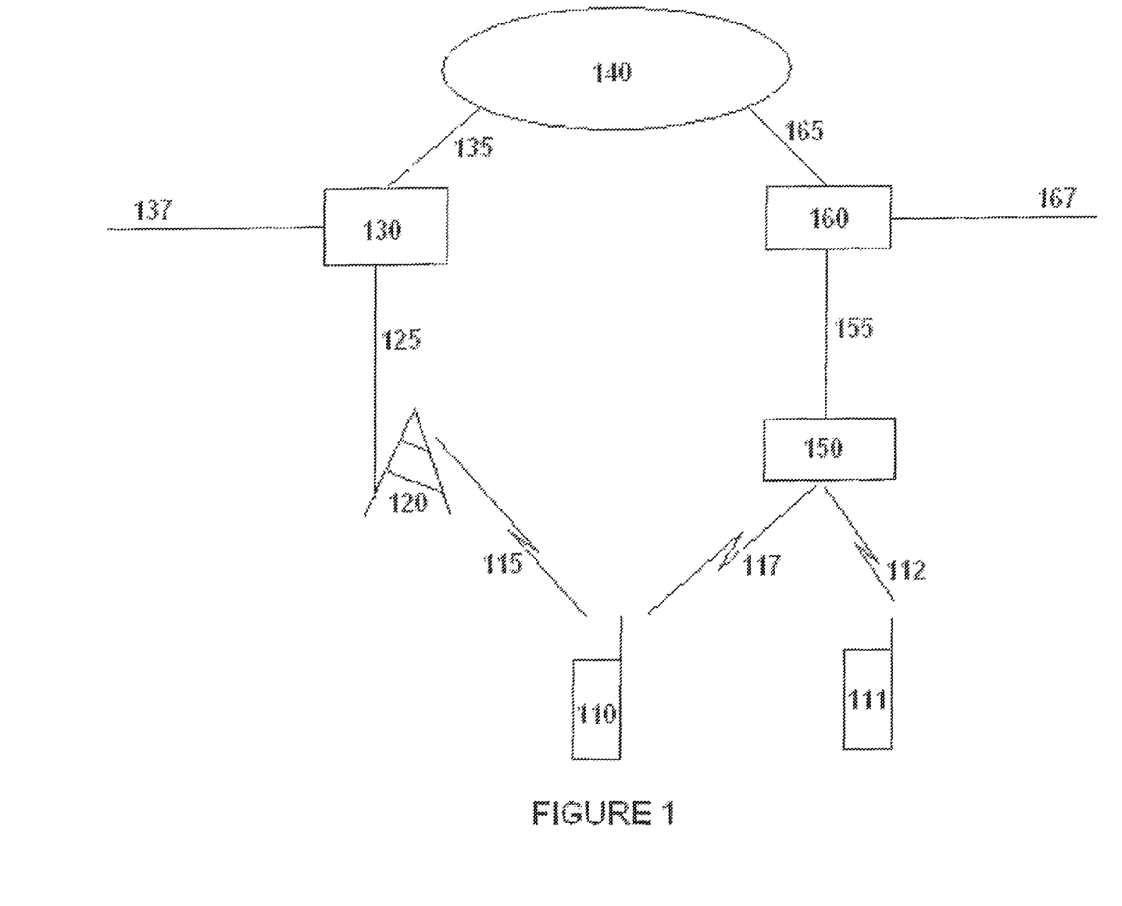
FIG. 1 illustrates an example system where at least some embodiments of the present invention may be employed

FIG. 1 illustrates an example system where at least some embodiments of the present invention may be employed. Mobile apparatus 110, or mobile 110, for example a mobile phone, personal digital assistant, PDA, cellular phone, palm-top computer, laptop computer, tablet computer or other mobile communications-capable device, is connected to base station 120 by means of wireless link 115. Wireless link 115 may comprise an uplink capable of conveying information from mobile 110 to base station 120 and a downlink capable of conveying information from base station 120 to mobile 110. Wireless link 115 may be in conformance with a cellular radio-access technology such as, for example, wideband code division multiple access, WCDMA, global system for mobile communications, GSM or long term evolution, LTE. Mobile 110 may be powered by a battery comprised in mobile 110. Device 110 is herein referred to as a mobile, but it is to be understood that the scope of the description encompasses also embodiments where the device is immobile.

Base station 120 may be capable of communicating in accordance with at least one, and in some embodiments more than one, cellular technology such as, for example, those mentioned above. Base station 120 may be powered from a stable power source and may be furnished with a backup battery. Base station 120 may be connected to a core network node 130 by means of connection 125. Connection 125 may be a wire-line connection or, for example, a directional microwave link. Core network node 130 may act as a gateway toward further nodes and may be configured to perform functions relating to controlling a cellular communications network. Examples of such functions include routing, authentication, access control and billing subscribers. Examples of core network nodes include switches, management nodes, serving gateways, support nodes and charging systems. Core network node 130 may connect to further core network nodes, which are not illustrated in FIG. 1, by means of connection 137. Core network node 130 may connect to the internet 140 by means of connection 135. In some embodiments core network node 130 connects to the internet via connection 137 instead of connection 135.

In some embodiments core network node 130 may be absent, in which case base station 120 may be connected directly to other base stations and, optionally, the internet 140. In such cases base station 120 may be furnished with at least one of the core network functions mentioned above. In some embodiments nodes not illustrated in FIG. 1 may be present, for example a base station controller node may be disposed between base station 120 and core network node 130.

In addition to the cellular chain comprising base station 120 and core network node 130, mobile 110 or similar devices may communicate by means of a non-cellular chain comprising access point 150 and gateway 160. Mobile 110 may communicate with access point 150 via link 117 which may operate according to a non-cellular RAT, such as wireless local area network, WLAN, technology or worldwide interoperability for microwave access, WiMAX, technology, for example. Link 117 may, like wireless link 115, comprise an uplink and a downlink. In embodiments where mobile 110 isn't capable of communicating with a non-cellular system, wireless link 117 does not exist. Access point 150 may be connected to gateway 160 by means of connection 155. Connection 155 may be a wire-line connection such as an Ethernet or digital subscriber line, DSL, connection, for example. Gateway 160 may be capable of communicating with internet 140 by means of connection 165 and by further gateways by means of connection 167, which may both be wire-line connections or wireless connections. In some embodiments gateway 160 is absent and access point 150 is directly connected to internet 140 and/or other access points.

Further mobile 111 may be configured to communicate with a wireless access point 150 of the non-cellular chain using wireless link 112. Wireless link 112 may be substantially similar to wireless link 117. It should be noted that although wireless links 115 and 112 are illustrated as connecting mobile units to fixed units, in some embodiments it is possible, for example, to have long term evolution or WLAN wireless links, or other kind of wireless links, between mobiles. Where wireless link 115 and wireless link 112 use the same frequency resource, such as for example a same frequency band, it may be possible that they cause interference to each other. For example, in case link 112 is allocated to use unlicensed spectrum and a cellular system is allowed to use the same unlicensed spectrum band, it becomes possible that interference occurs. In such a case it may be defined, for example, that the non-cellular system has preferential access to the spectrum band, and any cellular communication therein should stop using the spectrum band if it is determined the systems would otherwise use the spectrum band simultaneously.

Where mobile 110 is configured to use a cellular RAT on a spectrum band also used by another system, mobile 110 may be configured to employ cognitive radio principles when accessing the spectrum band. For example, mobile 110 may listen on the spectrum band for active communications before initiating radio communications on the spectrum band. In general this approach may be termed listen before talk. In a listen before talk approach, mobile 110 may wait for a predetermined time before initiating communications, such that if mobile 110 detects energy on the spectrum band, it won't initiate communications itself. In this way, mobile 110 may consider itself a non-preferential user of the spectrum band and stays away from a spectrum resource it believes to be in use by a node with higher preference, which may be a WLAN node, for example. In some embodiments, there are no preferential users in the sense that nodes will only try to use spectrum that they believe isn't already in use. Alternatively or in addition to mobile 110, a base station or other base node may be configured to operate in accordance with at least one cognitive radio principle, such as for example listen before talk.

The length of the predetermined time mobile 110 waits may depend on various factors. For example, where mobile 110 determines that a priority of data it has to send is high, it may use a shorter predetermined time, in other words wait for a shorter time before initiating radio communications. Conversely, where mobile 110 has low-priority data to send, it may be configured to wait a longer time, in other words use a longer predetermined time. The predetermined time mobile 110 before initiating radio communications will be termed the silent period in this document. As traffic on the spectrum band may be intermittent, using a longer silent period helps to ensure that the spectrum band is available for use by another system.

Time that does not fall within a silent period may be considered to fall within a transmission period. An active period may comprise a sensing period and the transmission period, wherein the sensing period may be used to sense for energy in the spectrum band, and the transmission period may be used for actual transmission of data. An example of a transmission period is a LTE subframe. For example, in an LTE embodiment an active period may comprise a downlink or uplink subframe and a sensing period immediately preceding the subframe. Thus the sensing period may be considered to be comprised in both the active period and the silent period, for example at the very end of the silent period immediately preceding the transmission period. As another example, the sensing period may be distributed throughout the silent period. Alternatively the sensing period may be considered to be comprised in the active period and not the silent period, such that the active period comprises contiguous sensing and transmission periods.

Responsive to determining that the spectrum band is in use, in other words that there is energy on the band, mobile 110 may be configured to wait before trying again. The length of time mobile 110 is configured to wait before trying again will be termed the retry period in this document. Also the retry period may depend on various factors, including the priority of data mobile 110 has to send. Mobile 110 may be configured to use a shorter retry period where it has high-priority data. Trying again sooner may result in a faster conclusion of transmission of the data, at the possible cost of expending battery resources on monitoring the spectrum band which may still be in use. Thus mobile 110 may be ready to expend more battery power to get high-priority data sent sooner.

The length of the retry period may depend on the length of the silent period, for example where the silent period is long, the retry period may be at least as long. In other words, if mobile 110 spends five seconds in the silent period, it may wait for at least ten seconds before re-starting a sensing. If the retry period is much shorter than the silent period, mobile 110 may spend much of its time listening in a sensing period, which may not be desired. In some embodiments, the length of the retry period is independent of the length of the silent period.

At least one of the silent period and retry period may be selected in mobile 110 in dependence of a length of a previous burst. Where mobile 110 has in a previous burst successfully transmitted a large chunk of data, mobile 110 may be configured to act in a less greedy manner with respect to the spectrum band. This may mean, for example, that the silent period is set to a longer value as mobile 110 may be more patient in re-accessing the spectrum band. Similarly where the silent period is increased in length, the retry period may also be increased in length. Where mobile 110 has sent only a short burst in the previous transmission, mobile 110 may select a shorter silent period and/or retry period.

In some embodiments, the retry period may be kept short despite a long silent period. Examples of this may include, for example, that mobile 110 has ample battery power or is powered by a stable power source, and that mobile is keen to send data but where it is advised that other users of the spectrum band have very high priority.

The silent period selected by mobile 110 may depend on parameters relating to other users of the spectrum band. For example, where another, or second, RAT is also using the spectrum band, mobile 110 may select the length of the silent period in dependence of at least one parameter relating to this second RAT. An example of this is an embodiment where mobile 110 is configured to select the length of the silent period in dependence of a priority level used in the second RAT. Where mobile 110 determines that data sent over the second RAT has high priority, it may be configured to select longer silent and/or retry periods. In some embodiments, mobile 110 takes into account also a priority of data to be sent from mobile 110. For example, if mobile 110 is to send high-priority data and the second RAT is engaged in high-priority traffic, mobile 110 may use similar silent and/or retry periods as if both were sending normal-priority data. In other words, mobile 110 may select the silent and/or retry periods in dependence of a difference in priority level between data in mobile 110 and the second RAT. In this way, higher-priority data is given more preferential access separately on each RAT. Similarly, where mobile 110 has low-priority data to send and the second RAT has high-priority data, mobile 110 may be configured to use even longer silent and retry periods than in the case where the second RAT had normal-priority data.

Other parameters relating to the second RAT that mobile 110 may use include traffic profiles and backoff periods. Mobile 110 may use knowledge of traffic profile and/or backoff periods in the second RAT to select times for transmission attempts when the spectrum band is more likely to be free.

In some embodiments, the sensing period may be selected in dependence of parameters relating to a second RAT. For example, responsive to learning that transmissions in a second RAT use low power, or occur infrequently, the sensing period may be increased in length. For example, the length of an active period may be kept constant, allocating a larger part of the active period to sensing and a smaller part to transmission. Alternatively, where the sensing period is comprised in the silent period, the portion of the silent period allocated to the sensing period may be increased.

In general, mobile 110 may learn of parameters relating to the second RAT directly or indirectly. An example of direct leaning is where mobile 110 is furnished also with second-RAT connectivity, for example a second-RAT transceiver, and it is capable of receiving information relating to the parameters from access point 150 or further mobile 111 via a wireless connection of the second RAT. An example of indirect learning is where mobile 110 is advised via the cellular RAT concerning prevailing parameters in the second RAT. The cellular chain may receive dynamic updates from the non-cellular chain concerning second-RAT parameters, which may be passed on to mobile 110 at least in part. The dynamic updates may be conveyed to the cellular chain via the internet 140 or a separate interconnection between the cellular and non-cellular chains. The dynamic updated may be updated toward the cellular chain responsive to change in second-RAT parameters in use.

Although discussed above in terms of mobile 110, the sensing of the spectrum band and selecting of the silent and retry periods may equally be performed in base station 120.

In general, there is provided an apparatus, such as for example a base station 120, mobile 110 or a control device for inclusion in a base station 120 or mobile 110. The control device may comprise a processor 20 as discussed in connection with FIG. 2, for example. The apparatus may comprise a memory configured to store at least one first parameter. The memory may be comprised in the control device, or in mobile 110 or base station 120 outside any control device, for example in the form of a random access memory chip.

The apparatus may comprise at least one processing core configured to control, using a cognitive radio principle, radio transmission using a first RAT, wherein the at least one first parameter is used in the cognitive radio principle. For example, the at least one processing core may be comprised in the control device, and it may be configured to control radio transmission of base station 120 or mobile 110. The at least one processing core may be configured to select the at least one first parameter in dependence of at least one second parameter, wherein the at least one second parameter at least one of relates to a second radio access technology and comprises a length of a last burst or silent period of the first radio access technology. In other words, the at least one first parameter may be selected based at least in part on at least one parameter relating to a second RAT, and/or the at least one first parameter may be selected based at least in part on at least one parameter relating to the first RAT. Where the parameter relates to the first RAT, it may comprise a length of a last burst or a length of a silent period.

In some embodiments, the apparatus is configured to control radio transmission using the second RAT. For example, the at least one processing core may be comprised in the control device, and it may be configured to control radio transmission of the base station 120 or mobile 110 using the second RAT. An example of such an embodiment is a mobile 110 that is capable of communicating with both the first RAT and the second RAT, wherein the mobile comprises radio transceivers for both the first RAT and the second RAT. Mobile 110 may comprise, in some embodiments, a multi-RAT radio transceiver supporting the first RAT and the second RAT. The at least one processing core may be configured to control the functioning of both radio transceivers, or both aspects of a multi-RAT transceiver. In other embodiments, the apparatus is single-RAT in the sense that it is capable of radio transmissions only in accordance with one RAT.

In some embodiments, the apparatus is configured to receive the at least one second parameter from a base node of the first RAT. For example, where the first RAT is cellular, a mobile apparatus may receive the at least one second parameter from a cellular base station, such as for example an eNB in an LTE system. For example, the eNB may advise a mobile LTE apparatus of at least one second parameter relating to a second RAT, wherein the second RAT may comprise a WLAN RAT. As another example, where the first RAT is non-cellular, an access point of a WLAN first RAT may advise a WLAN mobile node of at least one second parameter relating to a second, cellular RAT, wherein the second RAT may comprise, for example, a WCDMA RAT.

In some embodiments, the cognitive radio principle comprises at least one of listen before talk and spectrum sensing. Where the cognitive radio principle comprises spectrum sensing, selecting the at least one first parameter in dependence of the at least one second-RAT second parameter may comprise, for example, selecting a sensing pattern of the first RAT based on a transmission pattern of the second RAT. In other words, for example where the at least one second parameter defines that the second RAT transmits with a periodicity of 50 milliseconds, spectrum sensing of the first RAT may be configured to listen for at least 5 milliseconds every 25 milliseconds, to ensure that any current transmission on the second RAT is detected.

In some embodiments, the at least one first parameter comprises at least one of a sensing pattern for spectrum sensing, a time period defining how long the apparatus is to be silent when there is data to transmit, and a time period defining how long the apparatus is to wait before trying again responsive to detecting traffic. The second parameter has been discussed above as a silent period and the third parameter has been discussed above as a retry period.

In some embodiments, the at least one second parameter relating to the second RAT comprises at least one of a traffic profile, a backoff period, a priority level and a fairness parameter. A traffic profile may comprise, for example, a periodicity and/or burst duration of second-RAT transmissions. A backoff period may define, for example, how long a second-RAT transmitter is configured to wait responsive to detecting that the spectrum band is in use, a priority level may describe the priority of second-RAT data as discussed above, and a fairness parameter may relate to, for example, a rate at which apparatuses of the second RAT are configured to pre-empt use of the spectrum band.

In some embodiments, the at least one processing core is configured to determine whether at least one hidden transmitter is detected, for example a hidden transmitter of the second RAT. A hidden transmitter may be detected, for example, by distributing a sensing period in a silent period. A hidden transmitter may use a low transmitter power or transmit from a remote location such that the apparatus cannot detect its transmission from energy measured during a short sensing period, whereas the hidden transmitter could receive significant interference power from transmissions from the apparatus. In some embodiments, a hidden transmitter can operate using the first RAT.

By spectrum sensing it may be meant, for example, that the power of signals in the spectrum band is determined by measurements, or that edges of the spectrum band are determined by measurement. In some embodiments, spectrum sensing may comprise determining, by sensing, time-frequency patterns of transmissions within a spectrum band. As an example, it may be determined which spectrum band is to be used for listen before talk usage. A spectrum band may be expressed by two frequencies denoting the edges of the band, or by the lower-frequency edge in combination with a width of the band, or by the higher-frequency edge in combination with the width of the band.

In some embodiments, the transmit pattern of first-RAT transmissions depends on whether hidden transmitters are detected. For example, the at least one processing core may select to control the apparatus to employ continuous first-RAT transmissions only when no hidden transmitters are detected, and to use discontinuous first-RAT transmissions when at least one hidden transmitter is detected. In this context, continuous transmission may refer to transmission using contiguous subframes, and discontinuous transmission may refer to not using contiguous subframes. In some embodiments, timeslots are considered instead of subframes. Contiguous subframes may refer to subframes that are adjacent to each other in time. Contiguous timeslots may refer to timeslots that are adjacent to each other in time. An example of a RAT that uses subframes is LTE.

In some embodiments, the first RAT is LTE and the apparatus is configured to listen during a last symbol of an LTE subframe.

Figure 3:
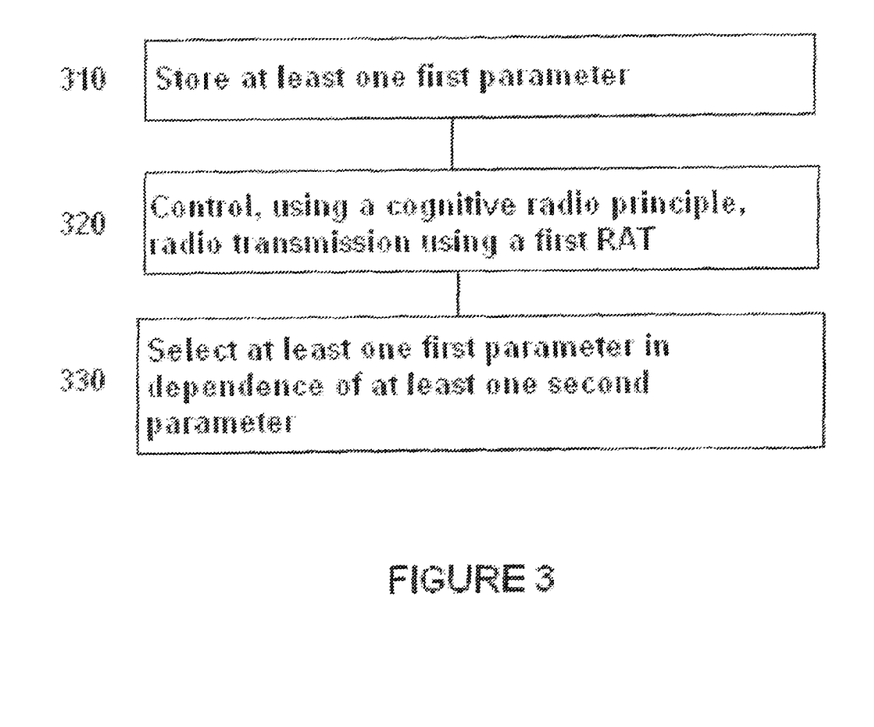
FIG. 3 is a flow diagram showing operations in accordance with a method in an example embodiment of the invention.

FIG. 3 is a flow diagram showing operations in accordance with a method in an example embodiment of the invention. The method may be performed in a base station or cellular mobile terminal, for example. In phase 310, the method comprises storing at least one first parameter. Storing may comprise storing in an on-chip cache memory or on an off-chip separate memory module, for example. The first parameter may comprise, for example, a length of a silent or retry period. In phase 320, the method comprises controlling, using a cognitive radio principle, radio transmission using a first radio access technology, RAT. The cognitive radio principle may comprise, for example, listen before talk. The first RAT may comprise a cellular RAT such as LTE. In phase 330, the method comprises selecting a value for the at least one first parameter in dependence of at least one second parameter. The at least one second parameter may at least one of relate to a second RAT and comprise a length of a last burst or silent period of the first RAT. The at least one second parameter may be obtained from signaling from the second RAT, or from a base node of the first RAT, or from a core network of the first RAT, for example.

Figure 4A:
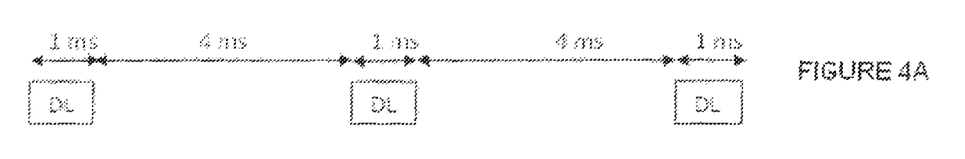
FIG. 4A illustrates a first transmission timing diagram according to an example embodiment of the invention.

FIG. 4A illustrates a first transmission timing diagram according to an example embodiment of the invention. In the figure, time increases from left to right, and "DL" denotes an active downlink transmission period using a cellular, for example LTE, RAT in a spectrum band, for example an unlicensed band. The timing diagram of FIG. 4A illustrates a case where cellular downlink transmission periods of 1 millisecond length occur every four milliseconds, for a 20% channel utilization. The downlink transmission period of this example may be considered to comprise a single subframe. This may reflect an initial allocation that leaves gaps, or silent periods, in the cellular transmissions allowing a second RAT to access the spectrum band. In some embodiments, responsive to detecting energy, the cellular devices may yield to give way to any thus detected users. In some embodiments, responsive to detecting energy during only during a small part of the gaps, cellular devices are configured to reduce the gaps and increase the frequency of the downling transmission periods. Cellular devices may measure for energy on the spectrum band during the gaps, and/or during sensing periods comprised in the active downlink periods. Hidden transmitters, which are at a distance from the cellular devices, may be detected during the frequently occurring long gaps. Using non-contiguous transmission, as in the pattern of FIG. 4A, may be beneficial in the presence of hidden transmitters, or when it isn't known if hidden transmitters exist. Using non-contiguous transmission in the presence of hidden transmitters may be beneficial if, for example, the hidden transmitters have increasing backoff times and they have only limited capability to detect transmissions of the cellular RAT. This may be the case for WLAN hidden transmitters, for example.

Figure 4B:
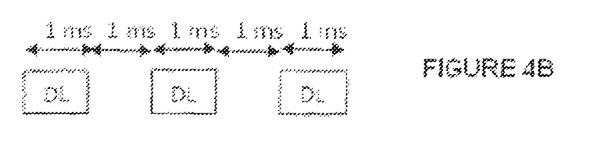
FIG. 4B illustrates a second transmission timing diagram according to an example embodiment of the invention.

FIG. 4B illustrates a second transmission timing diagram according to an example embodiment of the invention. This transmission pattern may be taken into use by the cellular devices after persisting in the pattern of FIG. 4A for a sufficient time to form an understanding of potentially interfering transmitters in the vicinity, for example. FIG. 4B illustrates a transmission scheme with a 50% channel utilization, where each 1-millisecond subframe of downlink cellular transmission is followed by a single 1-millisecond unused subframe, which in some embodiments allows for measuring for other transmissions in the spectrum band by a cellular base station or mobile. In some embodiments, the cellular devices are configured to adopt the pattern of FIG. 4B responsive to detecting at least one hidden transmitter while performing according to the pattern of FIG. 4A. Like the pattern of FIG. 4A, also the pattern of FIG. 4B uses no contiguous subframes for transmission.

Figure 4C:
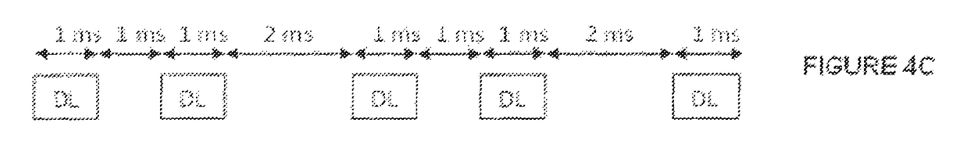
FIG. 4C illustrates a third transmission timing diagram according to an example embodiment of the invention.

FIG. 4C illustrates a third transmission timing diagram according to an example embodiment of the invention. FIG. 4C also illustrates use of non-contiguous subframes, meaning that no subframes immediately adjacent in time are used. The pattern of FIG. 4C has a 40% channel utilization rate and provides for a use of the spectrum band which appears random over a short period. An apparently random use of the spectrum band may be beneficial for spectrum band sharing by facilitating access to the band by other devices, such as for example devices configured to check the availability of the spectrum band in a non-random way.

Figure 5A:
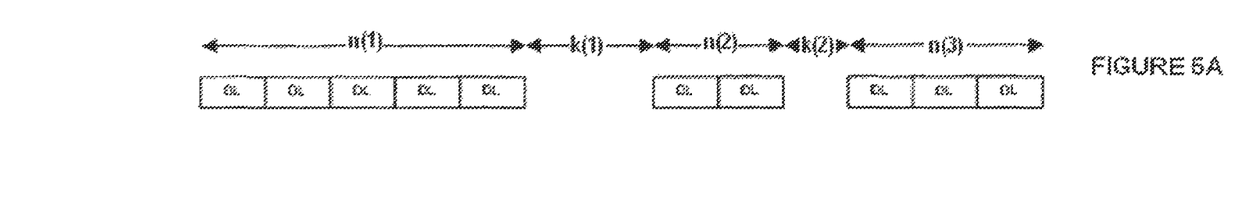
FIG. 5A illustrates a fourth transmission timing diagram according to an example embodiment of the invention.

FIG. 5A illustrates a fourth transmission timing diagram according to an example embodiment of the invention. The pattern of FIG. 5A is configurable such that a cellular RAT may use n contiguous subframes in the downlink, followed by k contiguous unused subframes. An active period may comprise the contiguous set of subframes used in downlink. Both n and k may be vectors, such that as for example in the figure, n(1)=5, k(1)=2, n(2)=2, k(2)=1 and n(3)=3. Arriving at the last elements of the vectors, the pattern may loop back and repeat. When n(i)>1 for any i, the pattern comprises using contiguous subframes. n and k may be pseudo-random and influenced by, for example, at least one of a length of a last burst or silent period of the cellular RAT. n and k may also or alternatively be based in at least in part on parameters that relate to another RAT occupying the spectrum band. The parameters n and/or k may also depend on whether a last, or recent, cellular burst was pre-empted by a transmission from another RAT. Each active period may commence with a sensing period.

Figure 5B:
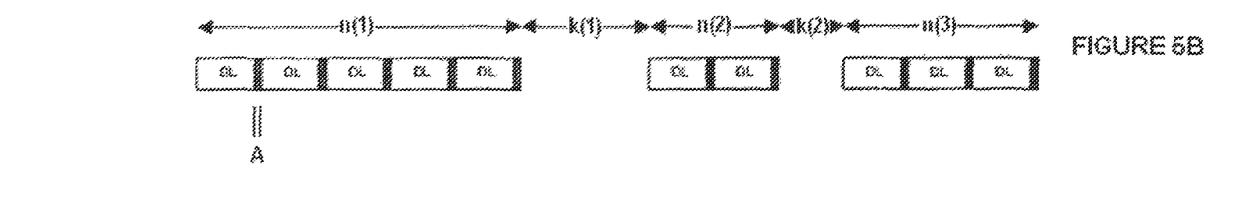
FIG. 5B illustrates a fifth transmission timing diagram according to an example embodiment of the invention.

FIG. 5B illustrates a fifth transmission timing diagram according to an example embodiment of the invention. In this figure, a pattern similar to that illustrated in FIG. 5A is shown, with sensing periods, or gaps, between subframes used for contiguous cellular downlink transmission. The first such gap of FIG. 5B is labeled "A". The gaps allow for another RAT, such as for example WLAN, to transmit during the gap period and for such transmission to be detected by at least one cellular device configured to listen during the gap. Responsive to detecting energy during a gap, the cellular devices may be configured to vacate the spectrum band to allow for the other RAT to use it. In other words, the other RAT can cause the spectrum band to be cleared and access it by transmitting during the gap. The parameters of the gap may be communicated between the cellular and non-cellular chains to facilitate the other RAT transmitting during the gap. The parameters of the gap may be decided by the other RAT and communicated to the cellular RAT, or the cellular RAT may decide the parameters of the gap and communicate them to the other RAT. Also in FIB. 5B, each contiguous set of subframes comprised in an active period may be commence with a sensing period.

Figure 5C:
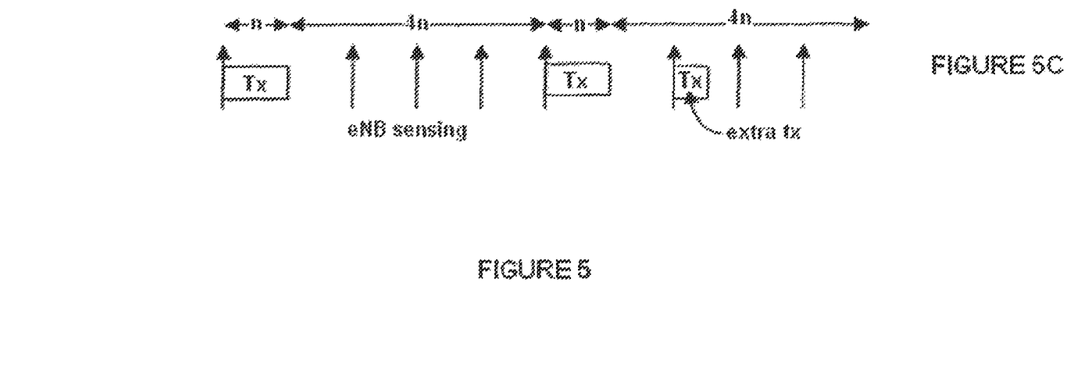
FIG. 5C illustrates a sixth transmission timing diagram according to an example embodiment of the invention.

FIG. 5C illustrates a sixth transmission timing diagram according to an example embodiment of the invention. In the embodiment of FIG. 5A, an LTE base station, eNB, is configured to transmit for n contiguous subframes, followed by silence for 4n contiguous subframes. The multiple 4 is merely an example. The eNB is in this embodiment configured to listen during the silent periods. Responsive to determining that there is no energy on the spectrum band during a silent period, the eNB may be configured to use a probability function to determine, whether to opportunistically perform a transmission. Such a transmission is illustrated in FIG. 5C as "extra tx". The probability function may comprise, for example, that on a first detected empty subframe the eNB assigns a probability of x % for transmission, and x is incremented by a constant or increasing increment each time no opportunistic transmission is made and no energy is detected. Therefore the eNB may, for example, assign a 2% probability for transmitting after a first silent subframe with no detected energy, increasing it to 4%, 6%, 8% and so on each time no energy is detected during a silent subframe. Each time, the eNB may derive a random number, and decide based on comparing the random number to the probability, whether to transmit. Each time the eNB either performs an opportunistic transmission or detects energy, the probability function may be configured to return to the first step corresponding to the lowest probability. An eNB operating according to the embodiment of FIG. 5C may therefore interrupt a scheduled silent period by performing an opportunistic transmission.

Figure 2:
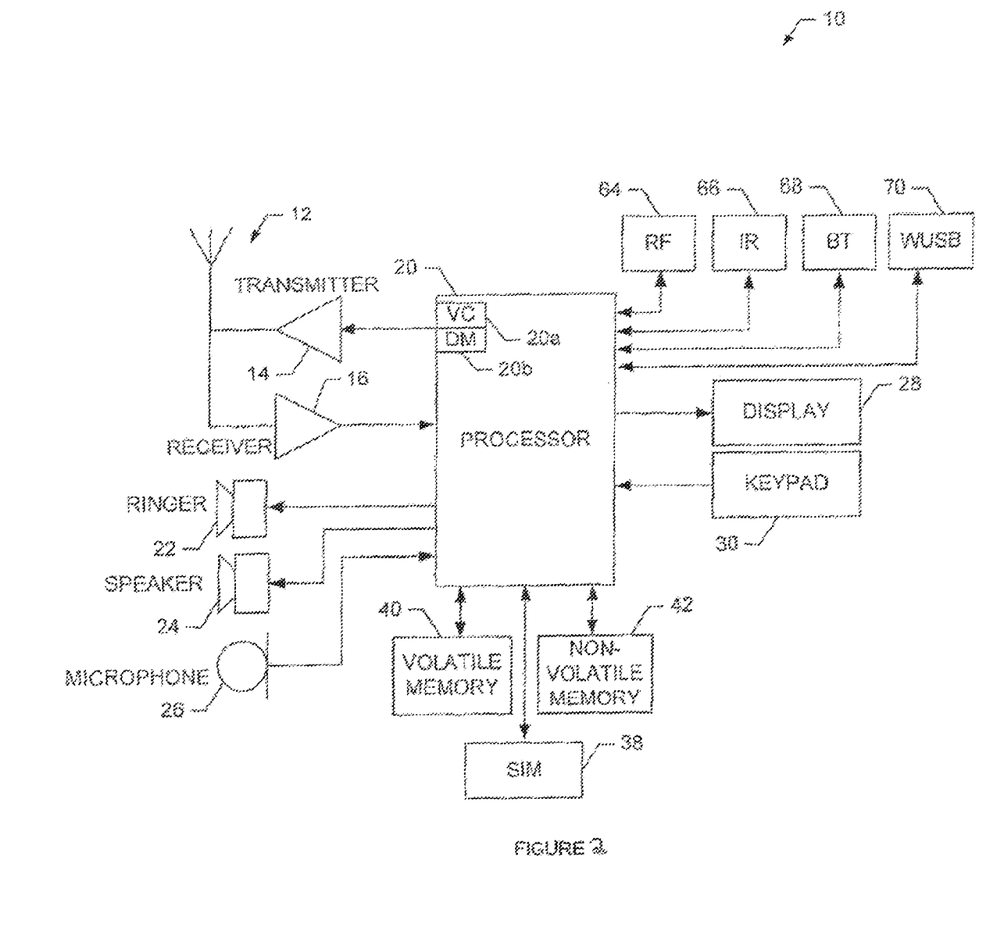
FIG. 2 illustrates a block diagram of an apparatus such as, for example, a mobile terminal, in accordance with an example embodiment of the invention.

FIG. 2 illustrates a block diagram of an apparatus 10 such as, for example, a mobile terminal, in accordance with an example embodiment of the invention. While several features of the apparatus are illustrated and will be hereinafter described for purposes of example, other types of electronic devices, such as mobile telephones, mobile computers, portable digital assistants, PDAs, pagers, laptop computers, desktop computers, gaming devices, televisions, routers, home gateways, and other types of electronic systems, may employ various embodiments of the invention.

As shown, the mobile terminal 10 may include at least one antenna 12 in communication with a transmitter 14 and a receiver 16. Alternatively transmit and receive antennas may be separate. The mobile terminal 10 may also include a processor 20 configured to provide signals to and receive signals from the transmitter and receiver, respectively, and to control the functioning of the apparatus. Processor 10 may be configured to control the functioning of the transmitter and receiver by effecting control signaling via electrical leads to the transmitter and receiver. Likewise processor 10 may be configured to control other elements of apparatus 10 by effecting control signaling via electrical leads connecting processor 10 to the other elements, such as for example a display or a memory. The processor 20 may, for example, be embodied as various means including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an application specific integrated circuit, ASIC, or field programmable gate array, FPGA, or some combination thereof. Accordingly, although illustrated in FIG. 2 as a single processor, in some embodiments the processor 20 comprises a plurality of processors or processing cores. Signals sent and received by the processor 20 may include signaling information in accordance with an air interface standard of an applicable cellular system, and/or any number of different wireline or wireless networking techniques, comprising but not limited to Wi-Fi, wireless local access network, WLAN, techniques such as Institute of Electrical and Electronics Engineers, IEEE, 802.11, 802.16, and/or the like. In addition, these signals may include speech data, user generated data, user requested data, and/or the like. In this regard, the apparatus may be capable of operating with one or more air interface standards, communication protocols, modulation types, access types, and/or the like. More particularly, the apparatus may be capable of operating in accordance with various first generation, 1G, second generation, 2G, 2.5G, third-generation, 3G, communication protocols, fourth-generation, 4G, communication protocols, Internet Protocol Multimedia Subsystem, IMS, communication protocols, for example, session initiation protocol, SIP, and/or the like. For example, the apparatus may be capable of operating in accordance with 2G wireless communication protocols IS-136, Time Division Multiple Access TDMA, Global System for Mobile communications, GSM, IS-95, Code Division Multiple Access, CDMA, and/or the like. Also, for example, the mobile terminal may be capable of operating in accordance with 2.5G wireless communication protocols General Packet Radio Service. GPRS, Enhanced Data GSM Environment, EDGE, and/or the like. Further, for example, the apparatus may be capable of operating in accordance with 3G wireless communication protocols such as Universal Mobile Telecommunications System, UMTS, Code Division Multiple Access 2000, CDMA2000, Wideband Code Division Multiple Access, WCDMA, Time Division-Synchronous Code Division Multiple Access, TD-SCDMA, and/or the like. The apparatus may be additionally capable of operating in accordance with 3.9G wireless communication protocols such as Long Term Evolution, LTE, or Evolved Universal Terrestrial Radio Access Network, E-UTRAN, and/or the like. Additionally, for example, the apparatus may be capable of operating in accordance with fourth-generation, 4G, wireless communication protocols such as LTE Advanced and/or the like as well as similar wireless communication protocols that may be developed in the future.

Some Narrow-band Advanced Mobile Phone System, NAMPS, as well as Total Access Communication System, TACS, mobile terminal apparatuses may also benefit from embodiments of this invention, as should dual or higher mode phone apparatuses, for example, digital/analog or TDMA/CDMA/analog phones. Additionally, apparatus 10 may be capable of operating according to Wi-Fi or Worldwide Interoperability for Microwave Access, WiMAX, protocols.

It is understood that the processor 20 may comprise circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the mobile terminal may be allocated between these devices according to their respective capabilities. The processor may additionally comprise an internal voice coder, VC, 20a, an internal data modem, DM, 20b, and/or the like. Further, the processor may comprise functionality to operate one or more software programs, which may be stored in memory. In general, processor 20 and stored software instructions may be configured to cause apparatus 10 to perform actions. For example, processor 20 may be capable of operating a connectivity program, such as a web browser. The connectivity program may allow the mobile terminal 10 to transmit and receive web content, such as location-based content, according to a protocol, such as wireless application protocol, WAP, hypertext transfer protocol, HTTP, and/or the like Apparatus 10 may also comprise a user interface including, for example, an earphone or speaker 24, a ringer 22, a microphone 26, a display 28, a user input interface, and/or the like, which may be operationally coupled to the processor 20. In this regard, the processor 20 may comprise user interface circuitry configured to control at least some functions of one or more elements of the user interface, such as, for example, the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. Although not shown, the apparatus may comprise a battery for powering various circuits related to the mobile terminal, for example, a circuit to provide mechanical vibration as a detectable output. The user input interface may comprise devices allowing the apparatus to receive data, such as a keypad 30, a touch display, which is not shown, a joystick, which is not shown, and/or at least one other input device. In embodiments including a keypad, the keypad may comprise numeric 0-9 and related keys, and/or other keys for operating the apparatus.

As shown in FIG. 2, apparatus 10 may also include one or more means for sharing and/or obtaining data. For example, the apparatus may comprise a short-range radio frequency, RF, transceiver and/or interrogator 64 so data may be shared with and/or obtained from electronic devices in accordance with RF techniques. The apparatus may comprise other short-range transceivers, such as, for example, an infrared, IR, transceiver 66, a Bluetooth™, BT, transceiver 68 operating using Bluetooth™ brand wireless technology developed by the Bluetooth™ Special Interest Group, a wireless universal serial bus, USB, transceiver 70 and/or the like. The Bluetooth™ transceiver 68 may be capable of operating according to low power or ultra-low power Bluetooth™ technology, for example, Wibree™, radio standards. In this regard, the apparatus 10 and, in particular, the short-range transceiver may be capable of transmitting data to and/or receiving data from electronic devices within a proximity of the apparatus, such as within 10 meters, for example. Although not shown, the apparatus may be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The apparatus 10 may comprise memory, such as a subscriber identity module, SIM, 38, a removable user identity module, R-UIM, and/or the like, which may store information elements related to a mobile subscriber. In addition to the SIM, the apparatus may comprise other removable and/or fixed memory. The apparatus 10 may include volatile memory 40 and/or non-volatile memory 42. For example, volatile memory 40 may include Random Access Memory, RAM, including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, etc., optical disc drives and/or media, non-volatile random access memory, NVRAM, and/or the like. Like volatile memory 40 non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing functions of the mobile terminal. For example, the memories may comprise an identifier, such as an international mobile equipment identification, IMEI, code, capable of uniquely identifying apparatus 10.

Without in any way limiting the scope, interpretation, or application of the claims appearing below, a technical effect of one or more of the example embodiments disclosed herein is that co-existence between RATs is improved. Another technical effect of one or more of the example embodiments disclosed herein is that interference caused to hidden transmitters is reduced. Another technical effect of one or more of the example embodiments disclosed herein is that access to a spectrum band is controlled based on relative priorities of data to be sent on different RATs.

Embodiments of the present invention may be implemented in software, hardware, application logic or a combination of software, hardware and application logic. The software, application logic and/or hardware may reside on memory, the control device or electronic components, for example. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 2. A computer-readable medium may comprise a computer-readable non-transitory storage medium that may be any media or means that can contain or store the instructions for use by or in connection with an instruction execution system, apparatus, or device, such as a computer. The scope of the invention comprises computer programs configured to cause methods according to embodiments of the invention to be performed.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. An apparatus, comprising:
a memory configured to store at least one first parameter;
at least one processing core configured to control, using a cognitive radio principle, radio transmission using a first radio access technology, wherein the at least one first parameter is used in the cognitive radio principle;
wherein the at least one processing core is configured to select the at least one first parameter in dependence of at least one second parameter, wherein the at least one second parameter at least one of relates to a second radio access technology and comprises a length of a last burst or silent period of the first radio access technology,
wherein the cognitive radio principle comprises at least one of listen before talk and spectrum sensing, and the apparatus is configured to control radio transmission using the second radio access technology.

2. An apparatus according to claim 1, wherein the apparatus is configured to receive the at least one second parameter from a base node of the first radio access technology.

3. An apparatus according to claim 2, wherein the at least one first parameter comprises at least one of a time period defining how long the apparatus is to be silent when there is data to transmit and a time period defining how long the apparatus is to wait before trying again responsive to detecting traffic.

4. An apparatus according to claim 1, wherein the at least one second parameter relating to the second radio access technology comprises at least one of a traffic profile, a backoff period, a priority level and a fairness parameter.

5. An apparatus according to claim 1, wherein the at least one processing core is configured to determine whether at least one hidden transmitter is detected.

6. An apparatus according to claim 5, wherein the at least one processing core is configured to, responsive to determining that at least one hidden transmitter is detected, configure the first radio access technology transmission to be discontinuous, and responsive to determining that no hidden transmitter is detected, configure the first radio access technology transmission to be continuous.

7. An apparatus according to claim 6, wherein the first radio access technology comprises long term evolution, continuous transmission comprises using contiguous subframes for transmission, and discontinuous transmission comprises not using contiguous subframes for transmission.

8. An apparatus according to claim 7, wherein the apparatus is configured to listen during a last symbol of a long term evolution subframe for second radio access technology traffic.

9. An apparatus according to claim 1, wherein the apparatus comprises a mobile communication device, the apparatus further comprising an antenna configured to provide signals to a radio transceiver comprised in the apparatus, the radio transceiver configured to provide signals to the at least one processing core.

10. A method, comprising:
storing at least one first parameter;
controlling, using a cognitive radio principle, radio transmission using a first radio access technology, wherein the at least one first parameter is used in the cognitive radio principle;
selecting the at least one first parameter in dependence of at least one second parameter, wherein the at least one second parameter at least one of relates to a second radio access technology and comprises a length of a last burst or silent period of the first radio access technology; and
comprising controlling technology in the apparatus communication using the second radio access,
wherein the cognitive radio principle comprises at least one of listen before talk and spectrum sensing.

11. A method according to any claim 10, comprising controlling in an apparatus the radio transmission using the first radio access technology from the apparatus, and further.

12. A method according to claim 10, comprising receiving the at least one second parameter from a base node of the first radio access technology.

13. A method according to claim 10, wherein the at least one first parameter comprises at least one of a time period defining how long to be silent when there is data to transmit and a time period defining how long to wait before trying again responsive to detecting traffic.

14. A method according to claim 10, wherein the at least one second parameter relating to the second radio access technology comprises at least one of a traffic profile, a backoff period, a priority level and a fairness parameter.

15. A method according to claim 10, comprising determining whether at least one hidden transmitter is detected.

16. A method according to claim 15, comprising, responsive to determining that at least one hidden transmitter is detected, configuring the first radio access technology transmission to be discontinuous, and responsive to determining that no hidden transmitter is detected, configuring the first radio access technology transmission to be continuous.

17. An apparatus, comprising:
a memory configured to store at least one first parameter;
at least one processing core configured to control, using a cognitive radio principle, radio transmission using a first radio access technology, wherein the at least one first parameter is used in the cognitive radio principle;
wherein the at least one processing core is configured to select the at least one first parameter in dependence of at least one second parameter, wherein the at least one second parameter at least one of relates to a second radio access technology and comprises a length of a last burst or silent period of the first radio access technology,
wherein the cognitive radio principle comprises at least one of listen before talk and spectrum sensing, wherein the apparatus is configured to receive the at least one second parameter from a base node of the first radio access technology.

18. An apparatus according to claim 17, wherein the at least one first parameter comprises at least one of a time period defining how long the apparatus is to be silent when there is data to transmit and a time period defining how long the apparatus is to wait before trying again responsive to detecting traffic.

19. An apparatus according to claim 17, wherein the at least one second parameter relating to the second radio access technology comprises at least one of a traffic profile, a backoff period, a priority level and a fairness parameter.

20. An apparatus according to claim 17, wherein the at least one processing core is configured to determine whether at least one hidden transmitter is detected.

21. An apparatus according to claim 20, wherein the at least one processing core is configured to, responsive to determining that at least one hidden transmitter is detected, configure the first radio access technology transmission to be discontinuous, and responsive to determining that no hidden transmitter is detected, configure the first radio access technology transmission to be continuous, wherein the first radio access technology comprises long term evolution, continuous transmission comprises using contiguous subframes for transmission, and discontinuous transmission comprises not using contiguous subframes for transmission and wherein apparatus is configured to listen during a last symbol of a long term evolution subframe for second radio access technology traffic.

22. An apparatus according to claim 17, wherein the apparatus comprises a mobile communication device, the apparatus further comprising an antenna configured to provide signals to a radio transceiver comprised in the apparatus, the radio transceiver configured to provide signals to the at least one processing core.

\* \* \* \* \*